March 26, 1968     H. P. FOCHLER     3,374,634
CORRUGATED TUBING STRUCTURE
Filed June 15, 1964                2 Sheets-Sheet 1
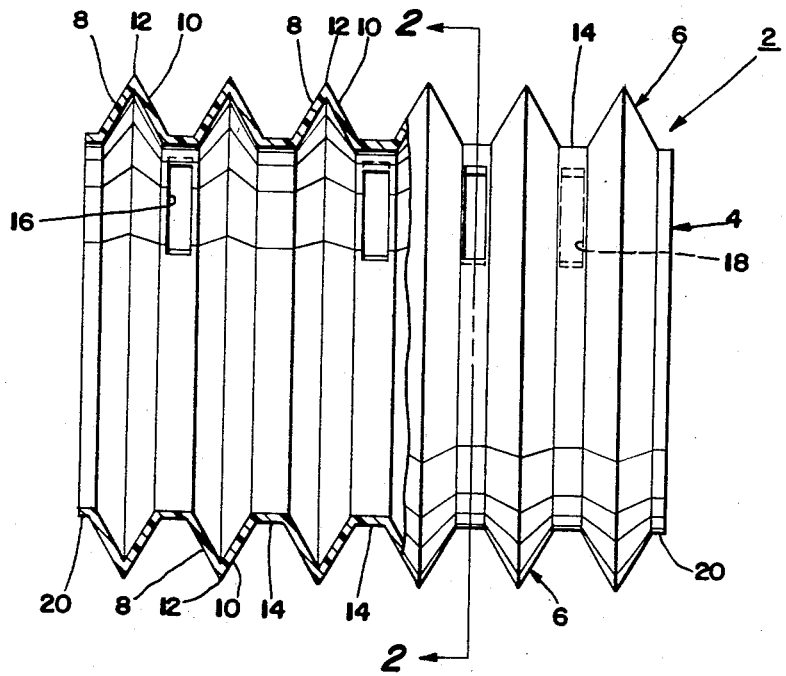
Fig. 1
Fig. 2
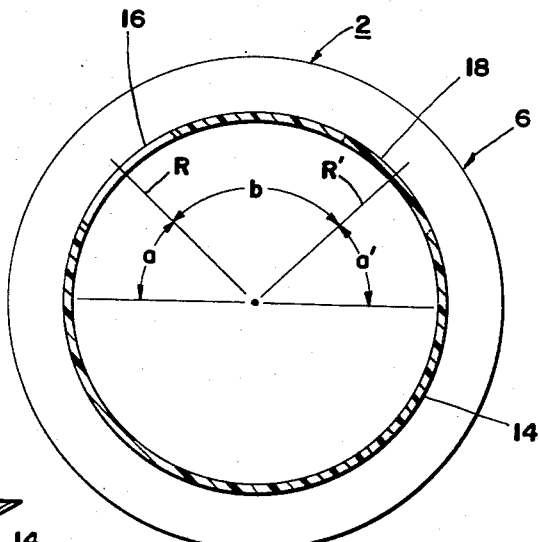
Fig. 3
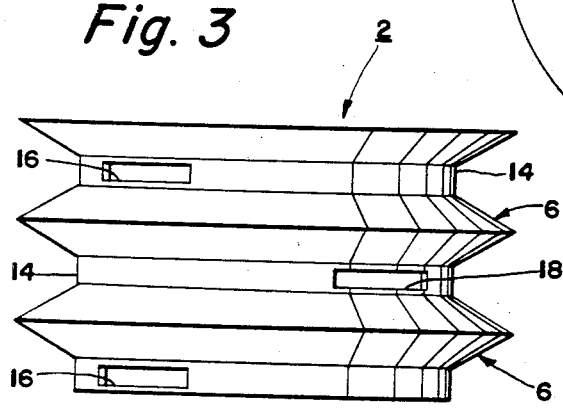
INVENTOR.
HELMUT P. FOCHLER
BY
Jeare, Getzer & Jeare
ATTORNEYS March 26, 1968  H. P. FOCHLER  3,374,634
CORRUGATED TUBING STRUCTURE
Filed June 15, 1964  2 Sheets-Sheet 2
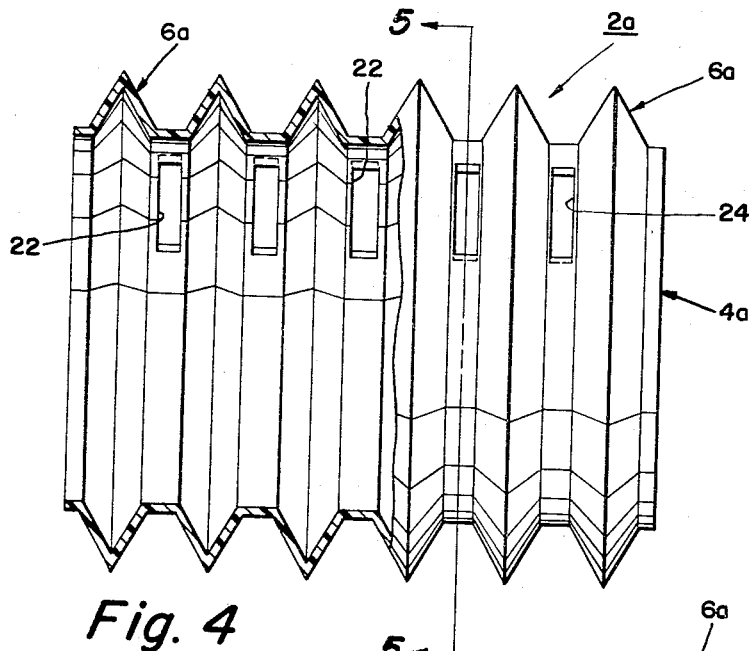
Fig. 4
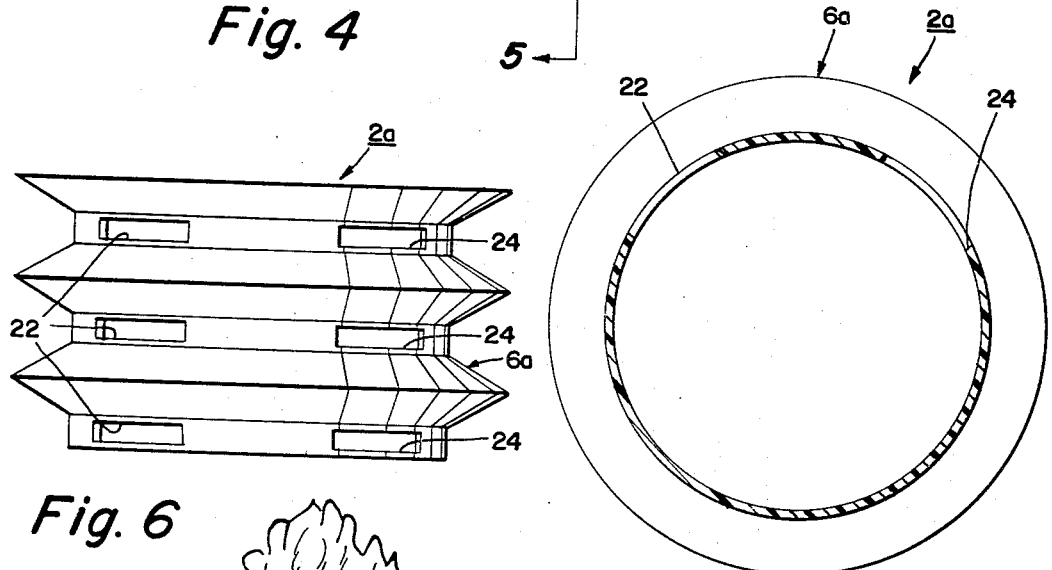
Fig. 6
Fig. 5
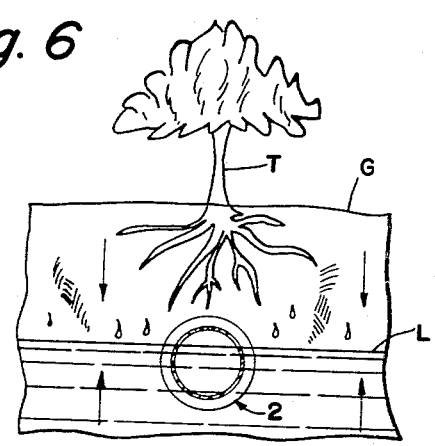
Fig. 7
INVENTOR.
HELMUT P. FOCHLER
BY
ATTORNEYS

United States Patent Office 3,374,634
Patented Mar. 26, 1968

3,374,634
CORRUGATED TUBING STRUCTURE
Helmut P. Fochler, Chagrin Falls, Ohio, assignor, by mesne assignments, to Continental Oil Company, a corporation of Delaware
Filed June 15, 1964, Ser. No. 374,902
5 Claims. (Cl. 61—10)

This invention relates to plastic tubing and particularly to the provision of an improved flexible, high strength crush-resistant corrugated tubing structure which may be expeditiously utilized for the drainage and conveyance of fluids, liquids and the like.

Heretofore, various types of pipe or tubing have been useful in the conveyance or transmission fields and under a wide variety of environmental conditions. In one application, fluid and liquids have heretofore been conveyed from one area to another via pipe or tubing buried in a supporting media, such as the earth, depending upon the particular application thereof. Such conventional pipe or tubing has heretofore been of a generally rigid, cylindrical construction made from various non-flexible materials, such as metal, clay, cement, concrete or the like.

An objection to such conventional type pipe or tubing has resided, at least in part, to the inability of such pipe or tubing to provide adequate drainage and flow characteristics for fluid, liquids and the like, particularly when applied in the environment of draining subterranean and/or surface waters and the subsequent conveyance of such waters from a source of origin or accumulation to an area of ultimate deposit.

A further difficulty in such application, has resided in the fact that while such heretofore known types of pipe or tubing, being of a generally rigid construction, provide generally good strength characteristics, they do not provide optimum flexibility and crush-resistant characteristics, particularly in the environment of draining and conveying subterranean and/or surface waters due to the shifting and/or changing contour of the supporting media, such as one buried in the earth.

In brief, the present invention provides an improved high strength, crush-resistant corrugated tubing structure made from polymeric materials, such as polyvinyl chloride, which can be facilely and economically produced by conventional molding, extrusion, or other transforming techniques. The improved structure includes an elongated, generally cylindrical tubing member of predetermined length having a plurality of radially symmetric, thin walled corrugations extending axially along the length thereof and providing the major crush-resistant characteristics in the finalized tubing structure. The structure further includes a plurality of fluid transmitting openings disposed at predetermined spaced intervals consecutively and/or alternatively intermediate respective of the corrugations, to form a corrugated tubing structure with optimum drainage and flow characteristics.

Accordingly, an object of the present invention is to provide an improved corrugated tubing structure which possesses good strength, and especially good crush-resistant characteristics, which can be readily and economically produced, and which incorporates structural characteristics to provide optimum drainage of liquids, fluids and the like for the conveyance of such fluids, liquids and the like from one area to another.

A further object of the present invention is to provide an improved corrugated tubing structure of the character described which is made from polymeric materials, such as polyvinyl chloride, and which comprises an elongated, generally cylindrical member having a plurality of radially symmetric, thin walled corrugations extending axially along the length thereof to provide the major crush-resistant characteristics in the fiinalized tubing structure, and which includes a plurality of fluid transmitting openings disposed at predetermined spaced intervals consecutively and/or alternatively intermediate respective of the corrugations to provide optimum drainage and flow characteristics in the fiinalized tubing structure.

Another object of the present invention is to provide a corrugated tubing structure of the character described which includes means at the opposed ends thereof for coupling one or any number of similar corrugated tubing structures together to provide a continuous systems for the drainage and conveyance of fluids, liquids or the like from one area to another.

Other features and advantages of the invention will be apparent from the following description taken in conjunction with the accompanying drawings:

FIG. 1 is an elevational view, partially in section and partially cut-away of the improved corrugated tubing structure made in accordance with the present invention;

FIG. 2 is a vertical section view taken along the plane indicated by the line 2—2 of FIG. 1;

FIG. 3 is a top plan view of the corrugated tubing structure illustrated in FIG. 2;

FIG. 4 is an elevational view, partially in section and partially cut-away and showing another modified form of the corrugated tubing structure made in accordance with the present invention;

FIG. 5 is a vertical section view taken along the plane indicated by the line 5—5 of FIG. 4;

FIG. 6 is a top plan view of the corrugated tubing structure illustrated in FIG. 5; and FIG. 7 is a diagrammatic representation, illustrating one application of the improved corrugated tubing structure of the present invention in the environment of draining and conveying subterranean and/or surface waters from one area to another.

Referring again to the drawings, and in particular to FIGS. 1 to 3 thereof, there is shown a corrugated tubing structure designated generally at 2, made from polymeric materials, such as polyvinyl chloride or the like, having good crush and tensile strength, abrasion resistance, resistance to heat distortion, and particularly good chemical inertness to withstand attack from acids, alkalies, metallic and ammonium salts, as well as various organic substances. In the embodiment shown, the structure comprises an elongated, generally cylindrical, in cross section, tubing ember 4 having a transverse dimension and length sufficient for a particular industrial and/or commercial application. The tubing member 4 is preferably formed to include a plurality of radially symmetric corrugations, designated generally at 6, which extend axially along the length of the tubing member.

Each corrugation 6, in the embodiment shown is preferably defined by a pair of thin, yet generally rigid side walls 8 and 10 which extend upwardly and convergently toward one another in a direction away from the longitudinal central axis of the tubing member 4. The side walls 8 and 10 merge angularly into one another to provide peripherally-continuous crest portions 12. The respective side walls 8 and 10 together define generally triangular, in cross section, corrugations which provide the major crush-resistant characteristics in the finalized tubing structure and which effectively prevent radial distortion of the tubing in normal application thereof. The inner marginal edges of the respective side walls 8 and 10 are integrally joined together by endless, generally planar, in cross-section, trough portions 14 which provide considerable strength adjacent of the corrugations and coact therewith to prevent axial distortion of the finalized tubing structure.

In accordance with one form of the present invention, tubing member 4 may be provided on its upper peripheral surface with two substantially parallel rows of radially disposed fluid or liquid transmitting openings, designated generally at 16 and 18. As best shown in FIGS. 1 and 3, the openings 16 in one row are alternately located intermediate adjacent of the corrugations 6 so as to be disposed in a staggered relationship relative to alternately located openings 18 in the other row, thereby to provide optimum drainage characteristics in the tubing structure for a particular application thereof.

The openings 16 and 18 proper are preferably formed in the planar trough portions 14 which interconnect adjacent of the corrugations 6 together, and hence, are generally arcuate in cross-section, as best shown in FIG. 2. In the embodiment shown, the openings 16 and 18 are preferably of a generally polygonal shape, such as the rectangular shape illustrated. It is contemplated, however, that the openings may be of any other suitably shaped configuration which will provide the desired drainage characteristics in the finalized corrugated tubing. The radial center lines R and R' of the openings 16 and 18 in each of the respective rows are preferably disposed at an angle $a$ and $a'$, such as about 45°, relative to the longitudinal central axis of the tubing member 4 so that the included angle $b$ defined by the radial center lines between the respective rows of openings is about 90°. By such radial disposition of the openings there is effectively achieved optimum drainage characteristics to transmit and drain surface waters descending through and/or subterranean waters ascending through the supporting media, such as when buried in the earth.

To provide optimum drainage characteristics, and yet to retain the maximum strength in the corrugated tubing structure, the openings 16 and 18 of each of the respective rows are preferably spaced axially from one another a predetermined distance sufficient for a particular and industrial and/or commercial application. It is generally perferred in some instances that there be about three openings per linear foot of tubing or, in other instances, that there be about six openings per linear foot of tubing. Accordingly, it is generally preferred that the axial spacing between the openings be within the range of about three to six openings per linear foot of tubing.

To provide a continuous system for the drainage and subsequent conveyance of fluid, liquids and the like from one area to another, the tubing 4 may be provided at each end with a peripherally-continuous flange 20 each of which extends axially therefrom to form an integral extension of the tubing member 4. Moreover, by such an arrangement any number of similar corrugated tubing structures may be disposed in end-to-end relationship and joined together by means of a conventional type coupling, such as by a collar, sleeve or the like, disposed in overlapping relationship around the flanges when the same are disposed in abutment against one another. In another instance, the transverse dimension of the flange adjacent one end of the tubing may be of a lesser or greater transverse dimension that that of the flange adjacent the other end, so that one flange may be readily inserted in overlapping or underlying relationship relative to a flange of a similar corrugated tubing structure to provide a tight, yet slidable fit between two corrugated tubing structures or between any number of axially aligned corrugated tubing structures to provide a continuous system, as aforesaid.

In FIGS. 4 and 5 the corrugated tubing structure, designated generally at 2a, is similar to that shown in FIGS. 1 to 3, except for a modification incident to the arrangement of the fluid transmitting openings. In this embodiment, the tubing member 4a is preferably provided with two oppositely disposed substantially parallel rows of openings 22 and 24 rather than with the aforementioned staggered relationship of rows and wherein the openings are located consecutively along the axial length of the tubing rather than alternatively relative to the corrugations 6a, thereby to substantially increase the number of openings, and hence, the drainage characteristics of the tubing for a particular application thereof. Moreover, it can be seen that any number and/or arrangement of openings and/or rows of openings may be provided to achieve the necessary drainage characteristics for a particular commercial and/or industrial application.

In one application, as shown in FIG. 7, any number of corrugated tubing structures 2 of FIGS. 1 to 3 for instance, may be suitably buried and/or installed at a predetermined depth below the surface of the ground G, such as for instance, in arid locales wherein the roots of vegetation T, such as those of trees, extend considerable distances below the surface of the ground in order to reach a source of moisture. Moveover, it can be seen from the diagrammatic illustration that subterranean waters, such as those which might entrain deleterious metallic or ammonium salts, ascend through the earth's strata, as illustrated by the arrows, until they reach an ultimate water level L which is coincident with the rows of openings provided in the corrugated tubing. At such level the water is immediately drained into and conveyed through the tubing system to an area of ultimate deposit without impairment of or damage to any vegetation which might otherwise result from contamination by such subterranean waters. Surface waters descending through the earth's strata, as indicated by the arrows, would similarly be drained into and subsequently conveyed through the corrugated system along with any such subterranean waters.

From the foregoing description and accompanying drawings, it will be seen that the present invention provides an improved corrugated tubing structure for use in the drainage and subsequent conveyance of fluids, liquids and the like from one area to another and which provides an improved arrangement where light-weight, economy of installation, and anti-corrosive properties are desirable. The corrugated tubing structure being made from polymeric materials, such as polyvinyl chloride, provides an effective construction which is highly resistant to the corrosive effect of brine or salt water, thereby to substantially increase the life of and prevent clogging of the tubing when utilized in such environments. Moreover, it will be seen that the radially slotted construction provides optimum drainage yet sufficient crush-resistant characteristics in the corrugated tubing structure for use in the drainage and conveyance of surface and/or subterranean waters, in underground irrigation, sprinkling systems or in other similar such field of application.

The terms and expressions which have been used are terms of description and not of limitation, and there is no intention in the use of such terms and expressions of excluding any equivalents of the features shown and described, or portions thereof, but it is recognized that various modifications are possible within the scope of the invention claimed.

I claim:

1. A flexible, high strength tubing product for use in the drainage and conveyance of fluid materials beneath the surface of the ground or the like, said tubing product comprising an elongated, generally cylindrical tubing member made from a polymeric material, said tubing member including a plurality of radially symmetrical imperforate corrugations, each corrugation extending continuously circumferentially in substantially a plane perpendicular to the longitudinal axis of said members, said corrugations being in equally spaced relation longitudinally along the length of said member, said corrugations each including generally flat side wall which converge upwardly into one another in a direction away from the longitudinal central axis of the tubing member to define a generally triangular configuration in cross-section, the side walls of each of said corrugations being connected circumferentially together by trough portions which extend generally planar in section parallel to the longitudinal central axis of the tubing member, said portions being imperforate walls on at least the lower half of the tubing member and at least two parallel rows of spaced fluid transmitting openings disposed only in an upper half of the tubing member and extending longitudinally along the length of the tubing member, said openings extending through said trough portions only for draining and conveying fluid materials through the tubing member.

2. A tubing product in accordance with claim 1, wherein the rows of openings are spaced alternatively intermediate the respective corrugations throughout the length of said tubing member.

3. A tubing product in accordance with claim 1, wherein said rows of openings are spaced consecutively intermediate the respective corrugations along the axial length of said tubing member.

4. A tubing product in accordance with claim 1, wherein the centers of the openings in each of said rows are disposed radially at an angle of about 45° relative to the longitudinal axis of said tubing member, and wherein the included angle between the centers of the respective rows of openings is 90°.

5. A tubing product in accordance with claim 1, wherein said tubing member includes an outwardly extending annular flange portion adjacent each of the opposed ends thereof which constitutes an axial extension of the tubing member and adapted for coupling with similar tubing members in end-to-end relationship to provide a continuous drainage and conveyance system.

References Cited

UNITED STATES PATENTS

| | | | |
|---|---|---|---|
| 2,750,232 | 6/1956 | Szantay et al. | |
| 986,940 | 3/1911 | Osborne | 61—11 |
| 1,055,674 | 3/1913 | Smith | 61—11 |
| 1,747,501 | 2/1930 | Butler et al. | 61—10 |
| 1,892,842 | 1/1933 | Kimberling | 61—11 X |
| 2,536,196 | 1/1951 | MacLeod | 61—13 |
| 3,103,789 | 9/1963 | McDuff et al. | 61—11 |
| 3,217,500 | 11/1965 | Diamond et al. | 61—11 |

FOREIGN PATENTS 1,163,703  4/1958  France.

EARL J. WITMER, *Primary Examiner.*